(12) United States Patent
Li et al.

(10) Patent No.: US 12,232,035 B2
(45) Date of Patent: Feb. 18, 2025

(54) CONFIGURATION FOR WAKE UP SIGNAL

(71) Applicant: Lenovo (Beijing) Ltd., Beijing (CN)

(72) Inventors: Yingying Li, Haidian District (CN); Zhi Yan, Xicheng District (CN); Haipeng Lei, Haidian District (CN); Hongmei Liu, Changping District (CN); Jie Shi, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 476 days.

(21) Appl. No.: 17/775,828

(22) PCT Filed: Nov. 22, 2019

(86) PCT No.: PCT/CN2019/120170
§ 371 (c)(1),
(2) Date: May 10, 2022

(87) PCT Pub. No.: WO2021/097792
PCT Pub. Date: May 27, 2021

(65) Prior Publication Data
US 2022/0394617 A1    Dec. 8, 2022

(51) Int. Cl.
*H04W 52/02* (2009.01)
*H04B 7/06* (2006.01)
(Continued)

(52) U.S. Cl.
CPC ... *H04W 52/0229* (2013.01); *H04W 52/0216* (2013.01)

(58) Field of Classification Search
CPC ......... H04W 52/0229; H04W 52/0216; H04W 68/025; H04W 56/0015; H04W 76/28;
(Continued)

(56) References Cited

U.S. PATENT DOCUMENTS

2019/0349856 A1    11/2019   Liu et al.

FOREIGN PATENT DOCUMENTS

WO   WO-2019179261 A1 *  9/2019
WO   WO-2019217914 A1 * 11/2019   ........ H04W 52/0216

OTHER PUBLICATIONS

19953038, "Extended European Search Report", EP Application No. 19953038, Jul. 13, 2023, 11 pages.
(Continued)

*Primary Examiner* — Joseph E Dean, Jr.
(74) *Attorney, Agent, or Firm* — FIG. 1 Patents

(57) ABSTRACT

Methods, a remote unit and a base unit are disclosed. According to one embodiment, a method at a base unit, comprising: generating a wake up signal (WUS) set consisted of a number of WUSs to indicate that are mote unit shall attempt to receive a paging message in a paging occasion (PO) on a Physical Downlink Control Channel (PDCCH) in a cell, mapping each of the WUSs to a number of resource sets, transmitting, to the remote unit, the WUS set on a time-frequency resource, wherein the PO is a set of PDCCH monitoring occasions (MOs), wherein the number of the WUSs is determined by the number of Synchronization Signal Blocks (SSBs) actually transmitted by the base unit, and wherein the $K^{th}$ WUS and the $K^{th}$ transmitted SSB are quasi co-located, where K is an integer no more than the number of the WUSs.

20 Claims, 15 Drawing Sheets

(51) Int. Cl.
*H04L 5/00* (2006.01)
*H04W 68/02* (2009.01)

(58) Field of Classification Search
CPC ............ H04W 52/0235; H04W 52/028; H04B 7/06952; H04L 5/0053; Y02D 30/70
See application file for complete search history.

(56) References Cited

OTHER PUBLICATIONS

Huawei, et al., "UE Power saving in RRC_IDLE mode", 3GPP TSG RAN WG1 Meeting #94bis, R1-1810714, Chengdu, China [retrieved Sep. 8, 2023]. Retrieved from the Internet <https://www.3gpp.org/ftp/TSG_RAN/WG1_RL1/TSGR1_94b/Docs>, Oct. 2018, 3 pages.

Lenovo, et al., "UE-group wake-up signal for Rel-16 NB-Iot", 3GPP TSG RAN WG1 Meeting #96bis, R1-1904568, Xi'an, China [retrieved Sep. 24, 2023]. Retrieved from the Internet <https://www.3gpp.org/ftp/tsg_ran/wg1_rl1/TSGR1_96b/Docs/>, Apr. 2019, 4 pages.

Spreadtrum Communications, "NR power saving on RRM measurement", 3GPP TSG RAN WG1#94Bis, R1-1811012, Chengdu, China [retrieved Sep. 8, 2023]. Retrieved from the Internet <https://www.3gpp.org/ftp/TSG_RAN/WG1_RL1/TSGR1_94b/Docs>, Sep. 29, 2018, 4 pages.

CATT, "Power saving signal/channel design and performance", 3GPP TSG RAN WG1 Meeting #98Bis, R1-1910353, Chongqing, China, Oct. 2019, 18 pages.

PCT/CN2019/120170, "International Preliminary Report on Patentability", PCT Application No. PCT/CN2019/120170, Jun. 2, 2022, 6 pages.

PCT/CN2019/120170, "International Search Report and Written Opinion", PCT Application No. PCT/CN2019/120170, Aug. 13, 2020, 7 pages.

201980102316.2, "Foreign Office Action", CN Application No. 201980102316.2, Jul. 26, 2024, 15 pages.

* cited by examiner

```
ssb-PositionsInBurst              CHOICE {
    shortBitmap                       BIT STRING (SIZE (4)),
    mediumBitmap                      BIT STRING (SIZE (8)),
    longBitmap                        BIT STRING (SIZE (64)),
} ssb-PositionsInBurst              SEQUENCE {
    inOneGroup                        BIT STRING (SIZE (8)),
    groupPresence                     BIT STRING (SIZE (8))
},
```

CONFIGURATION FOR WAKE UP SIGNAL

FIELD

The subject matter disclosed herein generally relates to wireless communications and, more particularly, to configuration for wake up signals, especially in NR-light system.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA),Long Term Evolution (LTE), Universal Mobile Telecommunications System (UMTS), UMTS Terrestrial Radio Access Network(UTRAN), Evolved UTRAN (E-UTRAN), Very Large Scale Integration (VLSI), Central Processing Unit (CPU), Graphics Processing Unit (GPU), Field Programmable Gate Array (FPGA),Dynamic RAM (DRAM), Synchronous Dynamic RAM (SDRAM), Static RAM (SRAM), Liquid Crystal Display (LCD), Light Emitting Diode (LED), Organic LED (OLED), Random Access Memory (RAM), Read-Only Memory (ROM), Erasable Programmable Read-Only Memory (EPROM or Flash Memory), Compact Disc Read-Only Memory (CD-ROM), Local Area Network (LAN),Wide Area Network (WAN), Personal Digital Assistant (PDA), User Equipment (UE), Downlink (DL), Uplink (UL), Evolved Node B (eNB), Next Generation Node B (gNB), New Radio (NR), Physical Uplink Shared Channel (PUSCH),Physical Uplink Control Channel (PUCCH),Physical Downlink Control Channel (PDCCH), Physical Downlink Shared Channel (PDSCH), Downlink Control Information (DCI),Resource Block (RB), Physical RB(PRB), Control Resource Set (CORESET), Identification (ID), Network (NW), Search Space (SS), System Information Block (SIB), Synchronization Signal Block (SSB),Narrowband Internet of Things (NB-IoT), Discontinuous Reception (DRX), extended DRX (eDRX), Power Saving Mode (PSM), Wake Up Signal (WUS), Narrowband WUS (NWUS), Paging Occasion (PO), Orthogonal Frequency Division Multiplexing (OFDM), Monitoring Occasion (MO), Bandwidth Part (BWP), Information Element (IE), Quasi Co-Located (QCL).

Narrowband Internet of Things (NB-IoT) is a Low Power Wide Area Network radio technology standard developed by 3GPP to enable a wide range of cellular devices and services including smart parking, utilities, wearables, and industrial solutions. NB-IoT focuses specifically on indoor coverage, low cost, long battery life, and high connection density.

Lower power consumption is one of the most important criteria in NB-IoT application. NB-IoT introduced Discontinuous Reception (DRX) mode and Power Saving Mode (PSM) for saving energy. With PSM, a device is registered with the network but may go into a deep sleep for up to 12.1 days. A device may wake up to send data or do a tracking area update. With DRX, the device needs not to monitor control channels most of the time. In 3GPP Release 13, extended DRX (eDRX) is introduced in which a device may go to sleep for up to 3 hours.

NB-IoT uses a wake up signal (WUS) to wake up a UE. The WUS is transmitted in idle mode only when the UE is required to decode a PDCCH transmission in paging occasions (POs). The narrowband wake up signal (NWUS) is transmitted over 12 subcarriers in the frequency domain in the NB-IoT carrier within available symbols of configured subframes.

The benefit of introducing WUS is that it reduces the unnecessary power consumption related to PDCCH monitoring. Without WUS, the UE would have to monitor the PDCCH for paging at each PO. With the WUS approach, the UE only needs to decode the PDCCH transmission when WUS is detected, otherwise, the UE will stay in sleep mode. This represents an efficiency improvement, especially when considering low activity on the control channels within a cell, e.g. at nighttime.

NB-IoT focuses on the lower end of the IoT market for low-power wide area networks. NB-IoT supports peak data rates of <160 kb/s, with at least 15 dB coverage extension and up to 10 years of battery life under certain conditions. NR specification is expected to be extended to support a lighter version of NR, NR-light, for mid-market IoT devices such as smartwatches, video surveillance cameras, and industrial sensors. The peak date rate of NR-light is expected to be 5~10 Mb/s with better power saving and coverage. Schemes for enhanced UE power saving, for example, wake up signal, is also a candidate feature that can be used for NR-light.

This invention relates to NR-light system, especially for wake up signal configuration, especially in NR-light system. This disclosure tried to address, among other things, some issues associated with configuration of wake up signal, especially in NR-light system.

SUMMARY

Methods and apparatuses for configuring wake up signal are disclosed.

In one embodiment, a method at a base unit and a base to perform the method are disclosed. The method comprises: generating a wake up signal (WUS) set consisted of a number of WUSs to indicate that are mote unit shall attempt to receive a paging message in a paging occasion (PO) on a Physical Downlink Control Channel (PDCCH) in a cell, mapping each of the WUSs to a number of resource sets, transmitting, to the remote unit, the WUS set on a time-frequency resource, wherein the PO is a set of PDCCH monitoring occasions (MOs), wherein the number of the WUSs is determined by the number of Synchronization Signal Blocks (SSBs) actually transmitted by the base unit, and wherein the $K^{th}$ WUS and the $K^{th}$ transmitted SSB are quasi co-located, where K is an integer no more than the number of the WUSs.

Preferably, the time-frequency resource is determined at least by a resource start position and a resource duration.

Preferably, the resource start position is calculated by a reference start position, a first offset between the reference start position and the resource start position, and a periodicity of the time-frequency resource, and the reference start position, the first offset and the periodicity of the time-frequency resource are configured by a higher layer of the base unit.

Preferably, the resource duration is determined by a beam sweeping period and a maximum number of the beam sweeping period, and the beam sweeping period is configured by a higher layer of the base unit.

Preferably, a gap between the end of the resource duration and the first slot of the PO is determined by a required gap configured by a higher layer of the base unit and the minimum value between each of the WUSs and corresponding MO.

Preferably, a start of each of the WUSs is determined at least by the resource start position, the start of the beam sweeping period, a WUS duration, the order at which the corresponding WUS is in the WUS set and a second offset between the start of the beam sweeping period and the start of the first WUS, the second offset is configured by a higher layer of the base unit.

In another embodiment, a method at a remote unit and a remote unit to perform the method are disclosed. The method comprises: receiving, from a base unit a wake up signal (WUS) set consisted of a number of WUSs; attempting to receive a paging message in a paging occasion (PO) on a Physical Downlink Control Channel (PDCCH) in a cell according to the received WUS set, wherein each of the one or more WUSs is mapped to a number of resource sets, wherein the PO is a set of PDCCH monitoring occasions (MOs), wherein the number of the WUSs is determined by the number of Synchronization Signal Blocks (SSBs) actually transmitted by the base unit, and wherein the $K^{th}$ WUS and the $K^{th}$ transmitted SSB are quasi co-located, where K is an integer no more than the number of the WUSs.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not, therefore, to be considered to be limiting in scope, the embodiments will be described and explained with additional specificity and detail through the use of the accompanying drawings, in which:

FIG. 7 is a schematic illustrating an example of ssb-PositionInBurst;

DETAILED DESCRIPTION

Figure 1:
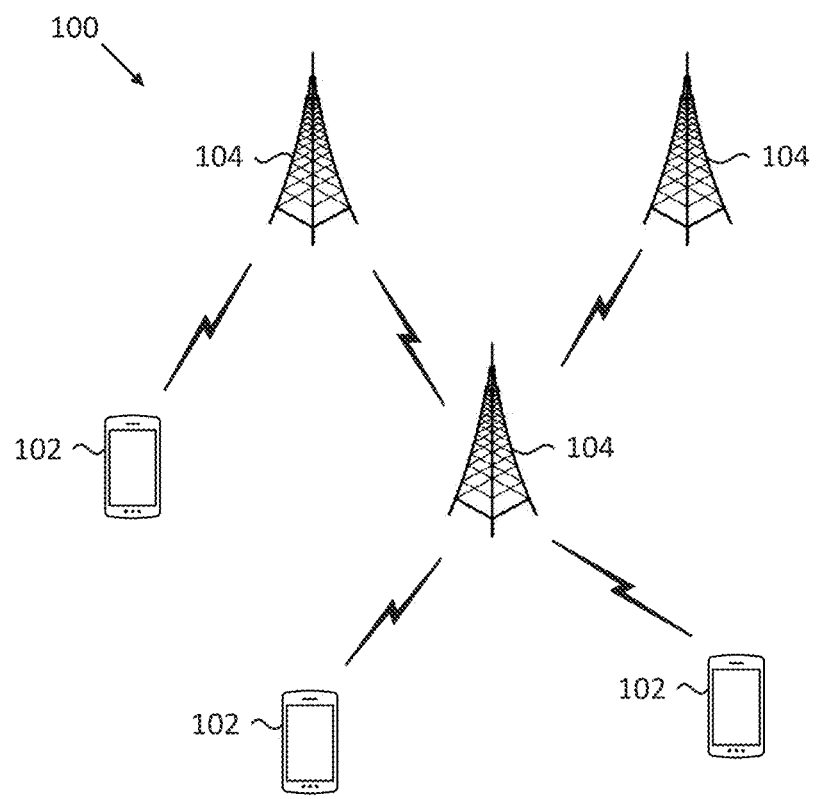
FIG. 1 is a schematic block diagram illustrating one embodiment of a wireless communication system for WUS configuration.

As will be appreciated by one skilled in the art, aspects of the embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable to programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth.In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, may be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that may direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

FIG. 1 depicts an embodiment of a wireless communication system 100. The wireless communication system 100 can support WUS transmission and reception. In one embodiment, the wireless communication system 100 includes remote units 102 and base units 104. Even though a specific number of the remote units 102 and the base units 104 are depicted in FIG. 1, it should be noted that any number of the remote units 102 and the base units 104 may be included in the wireless communication system 100.

In one embodiment, the remote units 102 may include computing devices, such as desktop computers, laptop computers, personal digital assistants ("PDAs"), tablet computers, smartphones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smartwatches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G NR. More generally, however, the wireless communication system 100 may implement some other open or proprietary communication protocol, for example, WiMAX, among other protocols.

The base units 104 may serve a number of the remote units 102 within a serving area, for example, a cell or a cell sector via a wireless communication link. The base units 104 transmit DL communication signals to serve the remote units 102 in the time, frequency, and/or spatial domain.

Figure 2:
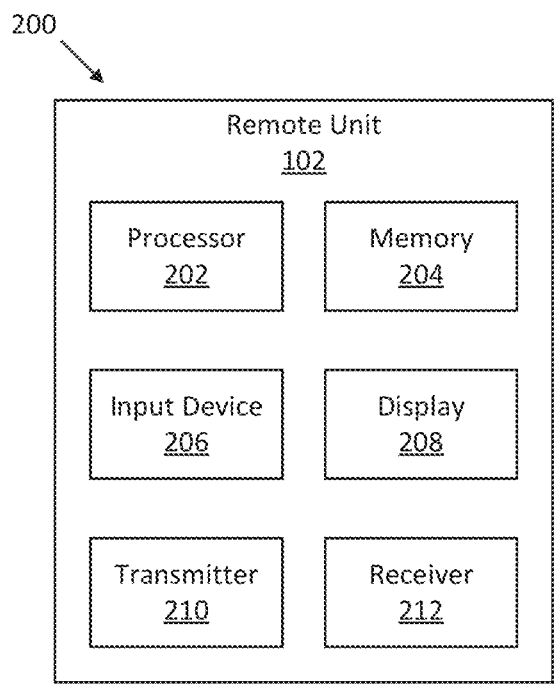
FIG. 2 is a schematic block diagram illustrating one embodiment of an apparatus that may be used to receive WUS.

FIG. 2 depicts one embodiment of an apparatus 200 that may be used to receive WUS. The apparatus 200, in one embodiment, includes a remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smartwatch, smart glasses, a heads-up display, or the like. Further, the display 208 may be a component of a smartphone, a personal digital assistant, a television, a tablet computer, a notebook (laptop) computer, a personal computer, a vehicle dashboard, or the like.

In certain embodiments, the display 208 includes one or more speakers for producing sound. For example, the display 208 may produce an audible alert or a notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and the display 208 may form a touchscreen or a similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
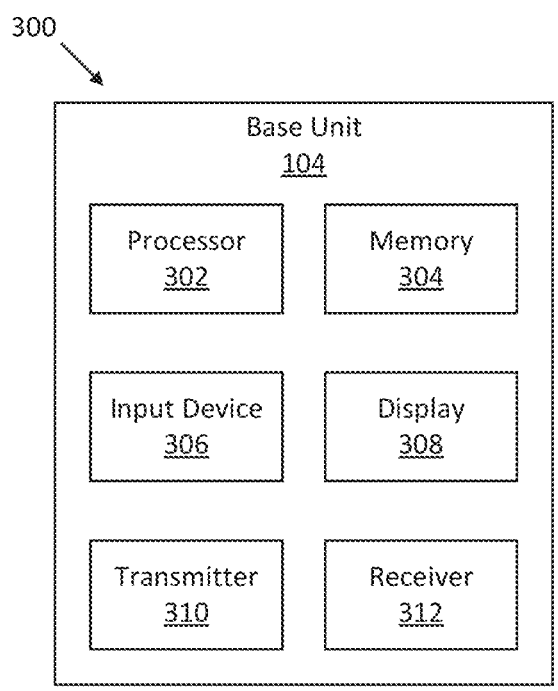
FIG. 3 is a schematic block diagram illustrating one embodiment of an apparatus that may be used to configure and transmit WUS.

FIG. 3 depicts one embodiment of an apparatus 300 that may be used to transmit WUS. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
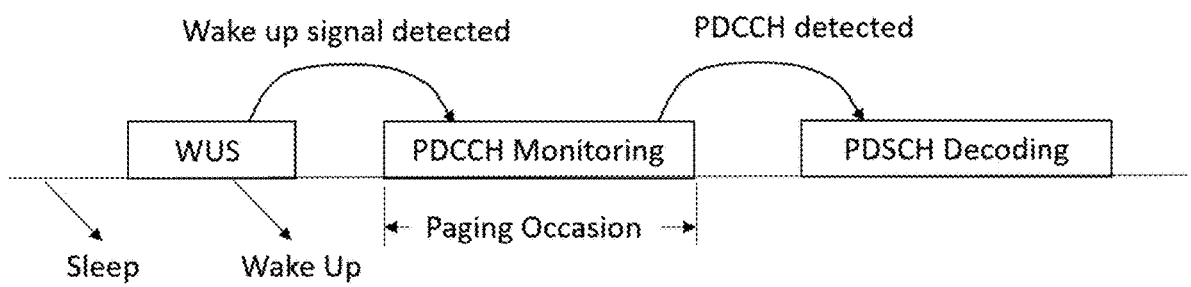
FIG. 4 is a schematic illustrating WUS function and related processed at a UE.

FIG. 4 is a schematic illustrating WUS function and related processed at a UE.

In NB-IoT, wakeup signal is designed for power saving. E-UTRAN uses WUS to indicate that the UE shall attempt to receive a paging message in the cell.

If a UE supports WUS and WUS configuration is provided in System Information, the UE shall monitor WUS using the WUS parameters provided in System Information. The WUS configuration includes a time offset between the end of WUS and the start of the first PO which UE is required to monitor. WUS is cell-specific configured with a maximal WUS duration, expressed as a ratio of maximal repetition number of Narrowband PDCCH (NPDCCH) for paging.

As shown in FIG. 4, upon receiving a WUS, a UE in sleep state will wake up. Next, according to the information carried in the detected wake up signal, the UE knows the PO. In the PO, the UE monitors PDCCH. After detecting PDCCH transmission, UE will decode PDSCH transmission based on the control data carried in the detected PDCCH transmission.

Figure 5:
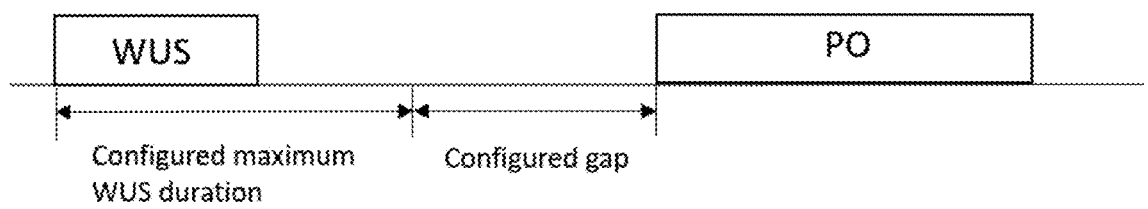
FIG. 5 is a schematic illustrating an example of WUS configuration and transmission relationship.

FIG. 5 is a schematic illustrating an example of WUS configuration.

WUS duration is the maximum time duration configured by the network for a UE to detect a WUS. The network leaves a time gap after the WUS to allow the UE to resynchronize to the network and eventually switch from a low-power state to a normal state in order to be ready to decode the PDCCH transmission.

The UE is configured with a transmission duration of WUS by higher layers. In a UE's DRX cycle, the UE knows that the WUS time location is configurable with respect to the associated PO location. The maximum duration of WUS is configured in SIB per NB-IoT carrier. The actual transmission duration for a WUS may be shorter than the configured maximum duration of WUS as shown in FIG. 5. The configured gap from the end of the configured maximum WUS duration to the beginning of an associated PO is configured as a number of absolute subframes by higher layer.

Figure 6:
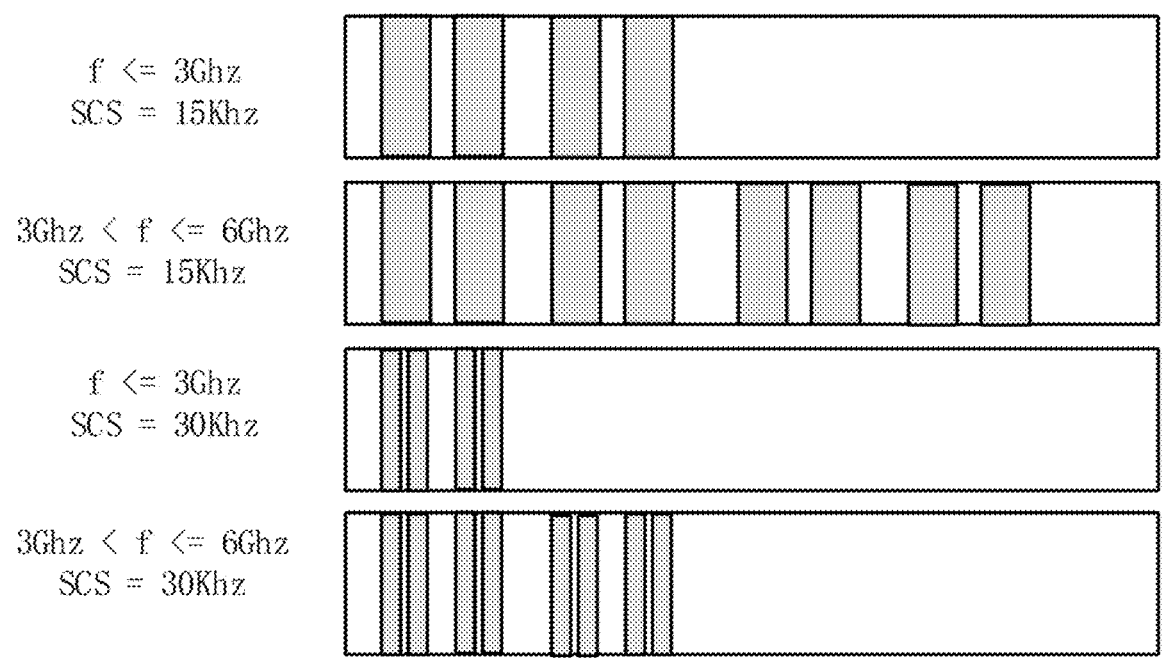
FIG. 6 is a schematic illustrating an example of SS burst set.

FIG. 6 is a schematic illustrating an example of SS burst set.

SS burst set is a collection of multiple SSBs within a SS Burst Set period. Each SSB corresponds to a beam direction in the SS burst set period assigned with a unique number starting from 0 and increasing by 1. The number of SSBs in the SS burst set period is related to an SSB pattern. For different pattern, 4/8/64 SSBs is configured in a SSB set.

As shown in FIG. 6, in NR, SSBs are transmitted in various patterns depending on subcarrier spacing, frequency range and the like. For operation frequency lower than 3 GHz, higher than 3 GHz and lower than 6GHz, higher than 6 GHz, and for subcarrier spacing (SCS) of 15 KHz and 30 KHz, the patterns of SSBs in a SS burst set are different.

FIG. 7 is a schematic illustrating an example of ssb-PositionsInBurst.

The number of actual transmitted SSBs is determined by IE ssb-PositionsInBurst. FIG. 7 shows an example of ssb-PositionsInBurst. For example, ssb-PositionsInBurst may be a bitmap of [1 1 0 1], which means 4 SSBs are configured in a SS burst by higher layer, but only 3 of them are actually transmitted, i.e., SSB 0, SSB1 and SSB3.

Figure 8:
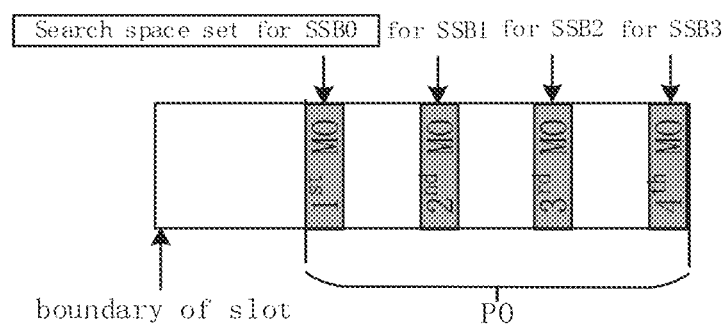
FIG. 8 is a schematic illustrating an example of PDCCH MOs for paging in NR.

FIG. 8 is a schematic illustrating an example of PDCCH MOs for paging in NR.

In NR, a PO is a set of PDCCH monitoring occasions (MO) and may consist of multiple time slots (e.g. subframe or OFDM symbol) where paging DCI may be sent. In multi-beam operations, the length of one PO is one period of beam sweeping and the UE can assume that the same paging message is repeated in all beams of the beam sweeping pattern and thus the selection of the beam(s) for the reception of the paging message is up to UE implementation. That is to say, for the multiple MOs, same paging message is transmitted, but the beam direction is different.

The PDCCH MOs for paging is a set of 'S' consecutive PDCCH MOs, where 'S' is the number of actual transmitted SSBs determined according to ssb-PositionsInBurstin SIB1. The $K^{th}$ PDCCH MO for paging in the PO corresponds to the $K^{th}$ transmitted SSB. For example, the beam direction for the $K^{th}$ MO is the same as that for the $K^{th}$ SSB. An example is shown in FIG. 8.

In NR, the start position of the first MO in a PO is configured by higher layer. PO may not start from the boundary of a slot, as shown in FIG. 8. In this case, when determining the position for the WUS based on the start position of the PO and the legacy configured gap (e.g. 40 ms) as described with reference to FIG. 5, it will be problematic.

Figure 9:
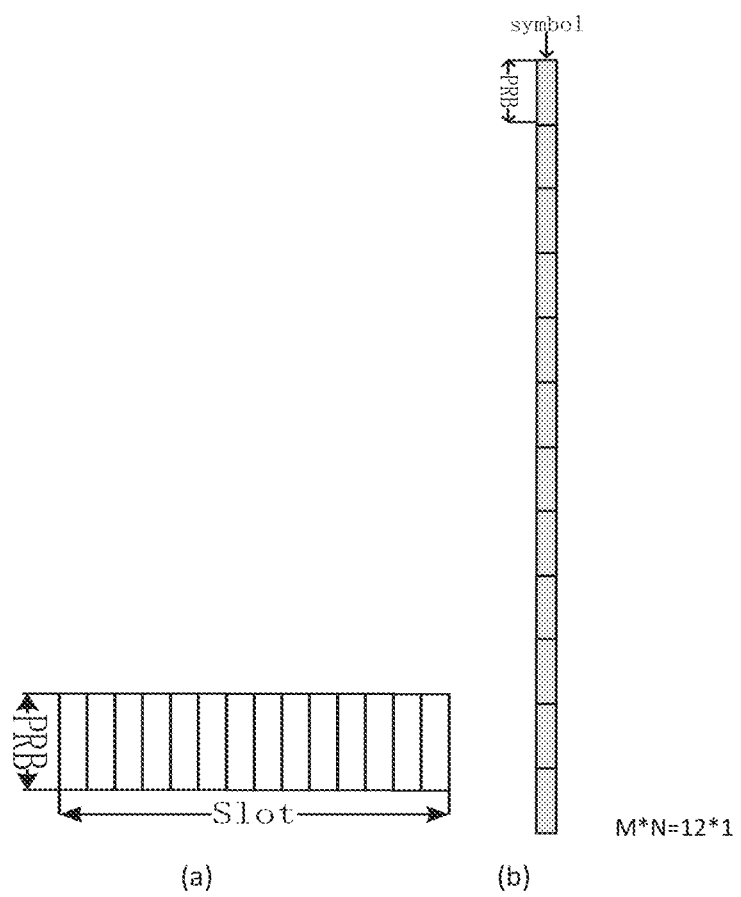
FIG. 9 is a schematic illustrating an example of WUS mapping.

FIG. 9 is a schematic illustrating an example of WUS mapping.

In NR, a WUS is generated by a plurality of base sequences, i.e., WUS sequence. Each WUS sequence is mapped to a basic resource unit. The basic resource unit may be a slot over a physical resource block (PRB) as shown in FIG. 9(a). Alternatively, the basic resource unit consists of M continuous PRBs in the frequency domain and N continuous OFDM symbols within a slot in the time domain as shown in FIG. 9(b). M and N may be configured by higher layer.

After mapping a WUS sequence into a basic resource unit, the mapped WUS sequence is repeated for multiple times to form a WUS. The time-domain repetition number may be configured by higher layer.

Figure 10:
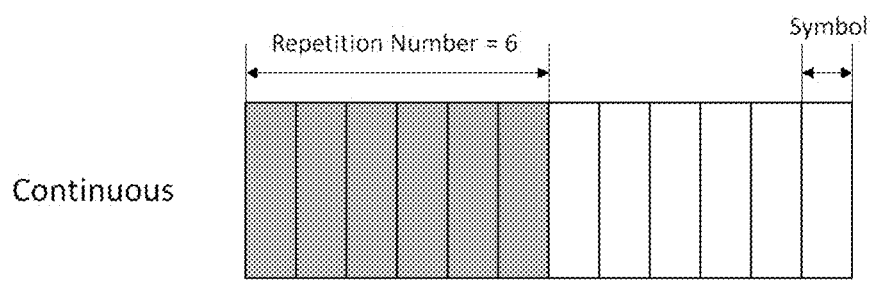
FIG. 10 is a schematic illustrating an example of the time domain transmission type for WUS.
Figure 10:
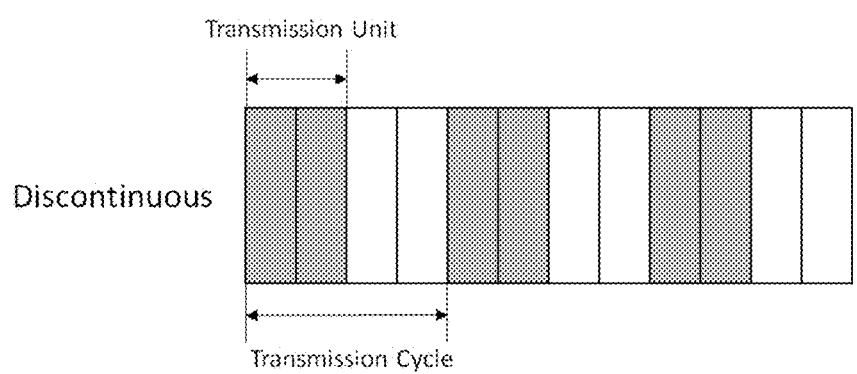

FIG. 10 is a schematic illustrating the time domain transmission type for WUS. The time domain transmission type may be continuous transmission or discontinuous transmission.

Discontinuous transmission may be defined with a transmission unit and a transmission cycle. The transmission unit may be configured by higher layer. Alternatively, the transmission unit may be determined according to the duration of a CORESET associated with the search space. For example, if the duration of a CORESET associated with the search space is configured to be 2 symbols, the transmission unit is 2.

As shown in FIG. 10(b), the transmission unit is 2 and the time-domain repetition number is 6. The resource corresponding to a transmission unit is referred to as a resource set. In FIG. 10(b), 3 resource sets are needed to transmit a WUS.

Figure 11:
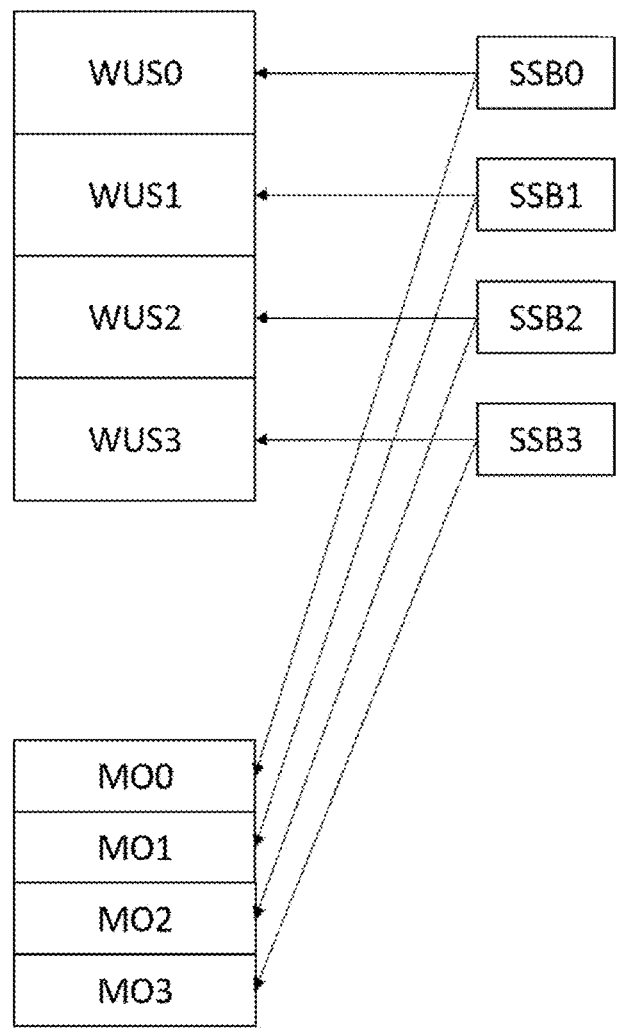
FIG. 11 is a schematic illustrating the association rule of SSB to WUS according to an embodiment of the invention.

Figure 11 is a schematic illustrating the association rule of SSB to WUS according to an embodiment of the invention.

In multi-beam operations, WUS set is a set of 'S' consecutive WUSs, where 'S' is the number of actual transmitted SSBs determined according to ssb-PositionsInBurst. Please refer to FIG. 7 for the description of ssb-PositionsInBurst.For example, assuming that the SS burst set has 4 SSBs, and ssb-PositionsInBurst is [1 1 0 1], so there is actually 3 SSB transmitted. Therefore, the number of WUSs in the WUS set is 3.

Here, before describing the association between WUS and SSB, quasi co-located (QCL) needs to be described at first.

Two antenna ports are said to be quasi co-located if properties of the channel over which a symbol on one antenna port is conveyed can be inferred from the channel over which a symbol on the other antenna port is conveyed.

Antenna ports quasi co-location in specification defines 4 types of QCL:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}.

If the high-level configures 'QCL-TypeD', the target signal inherits the beam information from the reference signal. For example, if PDSCH DMRS configures the reference signal as SSB and the QCL property is configured as QCL-TypeD, it indicates that the transmitting beam of the PDSCH is the same or similar asthe beam of the SSB.

The mapping from actual transmitted SS blocks to WUSs is in increasing order of the time-multiplexed WUS number within a WUS transmission resource. For example, the $K^{th}$ WUS in the time domain corresponds to the $K^{th}$ transmitted SSB. In other words, the $K^{th}$ WUS and $K^{th}$ transmitted SSB are quasi co-located with respect to 'QCL-TypeD'.

Figure 12:
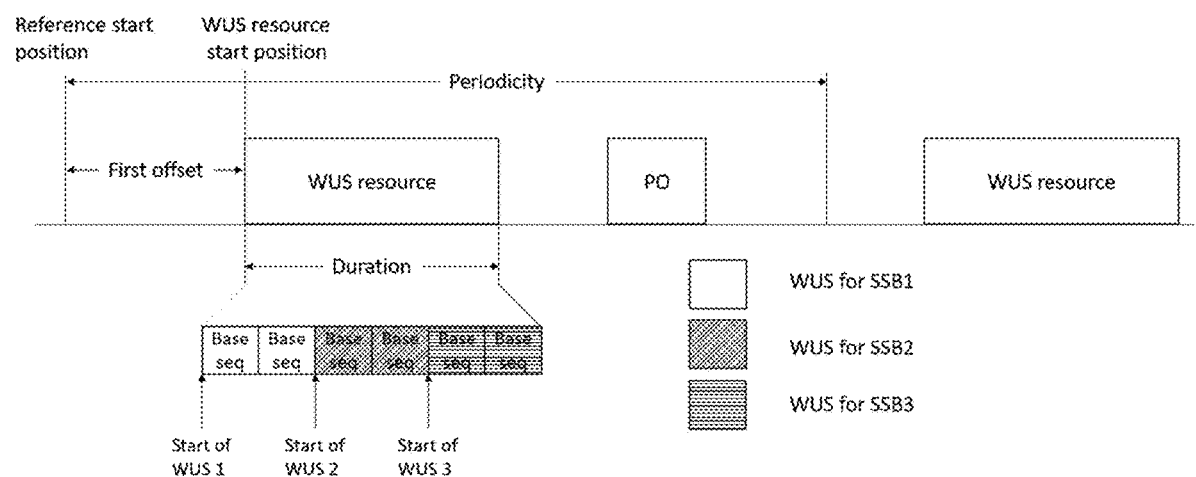
FIG. 12 is a schematic illustrating explicitly configuring WUS resource according to an embodiment of the invention.

FIG. 12 is a schematic illustrating explicitly configuring WUS resource according to an embodiment of the invention.

In order to transmit WUS, the WUS resource needs to be configured or determined at the transmission side. In this embodiment, an explicit configuration for WUS resource will be described.

As shown in FIG. 12, higher layer may configure a reference start position, a periodicity of the WUS resource, a first offset and a duration of the WUS resource.

The periodicity of the WUS resource is configured as the value of the DRX cycle.

A WUS resource start position may be calculated by the reference start position, the first offset and the periodicity of the WUS resource. For example, based on the reference start position and the first offset configured by higher layer, the WUS resource start position in this cycle may be determined. Based on the determined start position of WUS resource in this cycle and the periodicity of WUS resource, the start position of WUS resource in to the following cycles may be determined. In this way, the start position and the duration of a WUS resource are determined, and therefore the specific position of the WUS resource is determined.

After determining the WUS resource, the specific resource for each WUS in the WUS set needs to be determined. According to this embodiment, the start position of each WUS of the WUS set in the WUS resource may be configured by higher layer.

Figure 13:
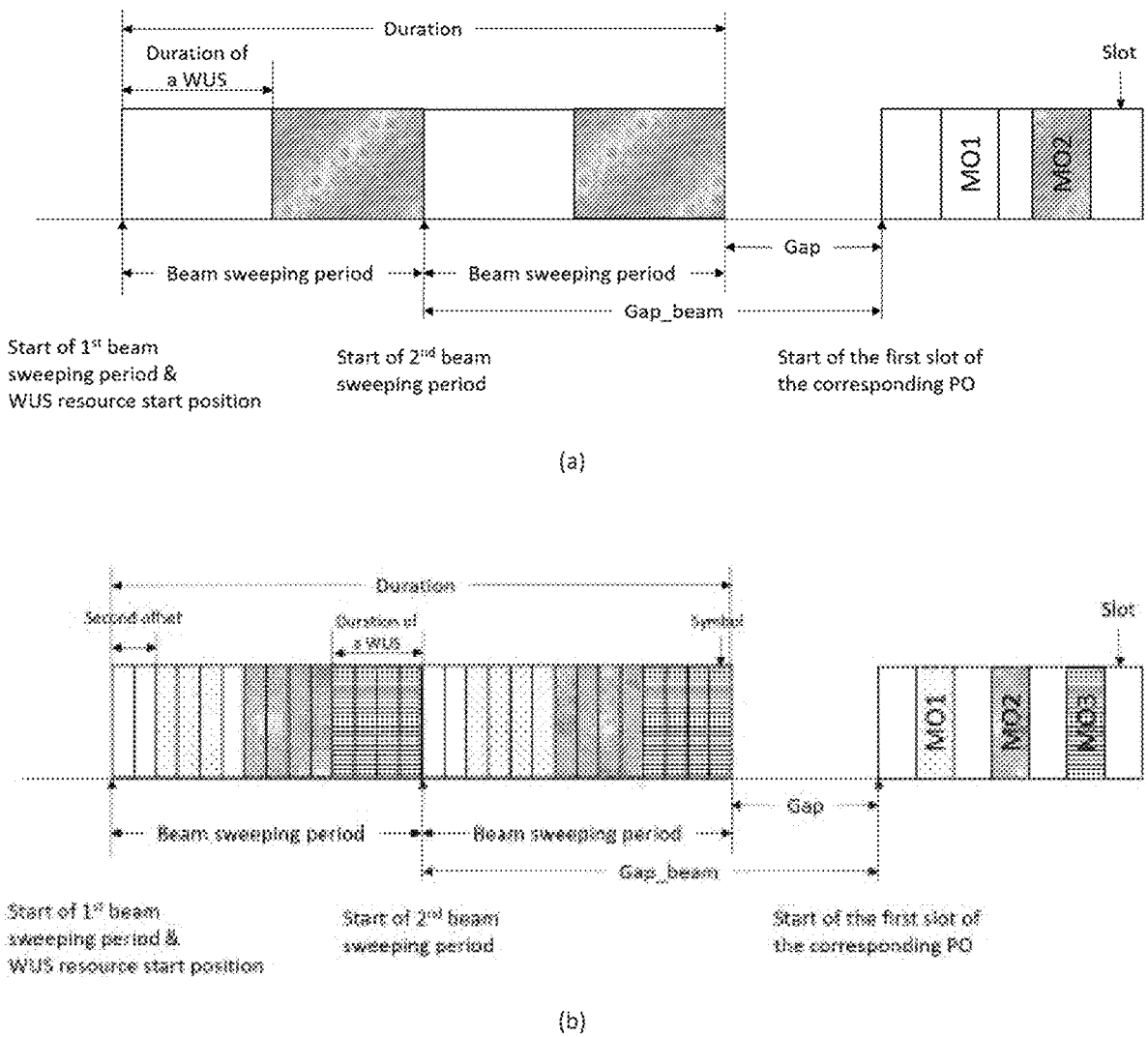
FIG. 13 is a schematic illustrating implicitly indicating WUS resource according to an embodiment of the invention.

FIG. 13 is a schematic illustrating implicitly indicating WUS resource according to an embodiment of the invention. FIG. 13(a) shows in slot level and FIG. 13(b) shows in symbol level.

A beam sweeping period may be configured by higher layer or be fixed.

As shown in FIG. 13(a), there are two beam sweeping periods in the duration. The maximum number of beam sweeping periods may be determined by the higher layer or by time-domain repetition number and transmission unit. In turn, the duration may be determined according to the beam sweeping period and the maximum number of beam sweeping periods.

As described above, the transmission unit of a WUS may be determined by higher layer. Alternatively, the transmission unit may be determined by the beam sweeping period, the number of WUS in a WUS set and the continuous OFDM symbols number of the basic resource unit.

In this description, a gap is defined as the interval between the end of the WUS resource and the start of the first slot of the corresponding PO.

The start position of WUS resource may be determined based on the start of the first slot of the corresponding PO, the gap, the beam sweeping period and the maximum number of beam sweeping periods.

In FIG. 13, a gap_beam which is the gap between the end of a beam sweeping period and the start of the first slot of the corresponding PO may be configured by higher layer, or determined by the gap mentioned above and the order at which the beam sweeping period is in the WUS resource. The parameter gap_beam may be used to determine the position of a beam sweeping period corresponding to the gap_beam.

The start of a beam sweeping period may be calculated by the start of the first slot of the corresponding PO, the beam sweeping period and the gap corresponding to the beam sweeping period, i.e., gap_beam.

The total length of the S WUS durations may be less than a beam sweeping period. In this case, higher layer may configure a second offset in a beam sweeping period. The second offset indicates the interval between the start of the beam sweeping period and the start of the first WUS in the beam sweeping period, as shown in FIG. 13(b).

The duration of a WUS in beam sweeping period may be determined by the transmission unit and the continuous OFDM symbols number of the basic resource unit. Alternatively, the duration of a WUS in beam sweeping period may be determined by the beam sweeping period and the number of WUS, for example, by dividing the beam sweeping period by the number of WUSs in a WUS set.

The start of a WUS in a beam sweeping period may be determined at least by the start of a beam sweeping period, the WUS duration, the order at which the WUS is in the beam sweeping period and the second offset.

Figure 14:
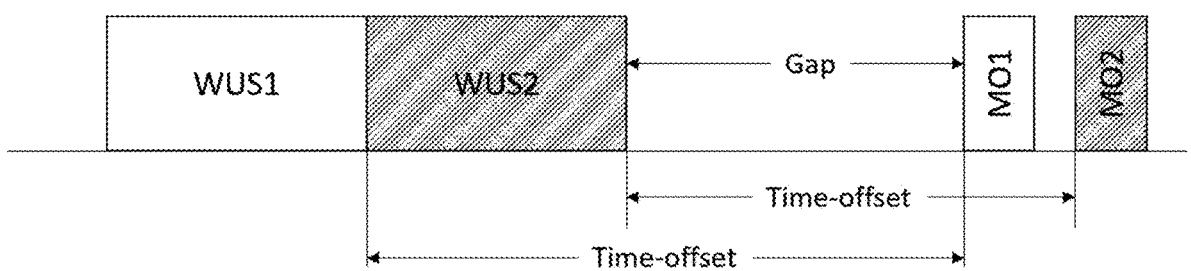
FIG. 14 is a schematic illustrating a smaller gap configuration according to embodiments of the invention.

FIG. 14 is a schematic illustrating the gap configuration according to an embodiment of the invention.

In NR, since the time offset between a WUS and its associated MO may contain the transmission time of other WUS and MO, the gap between the end of the WUS resource and the start of the first slot of the corresponding PO may be determined in a more efficient manner.

Higher layer configures a required gap value. The gap between the end of the WUS resource and the start of the first slot of the corresponding PO shown in FIG. 14 is determined by the required gap value and a minimum time offset between each of the WUS and corresponding MO. For example, the gap, in unit of ms/slot/symbol, makes the time offset between WUS and MO equals to or larger than the required gap value.

A way to indicate WUS resource implicitly has been described with reference to FIGS. 13 and 14.

Figure 15:
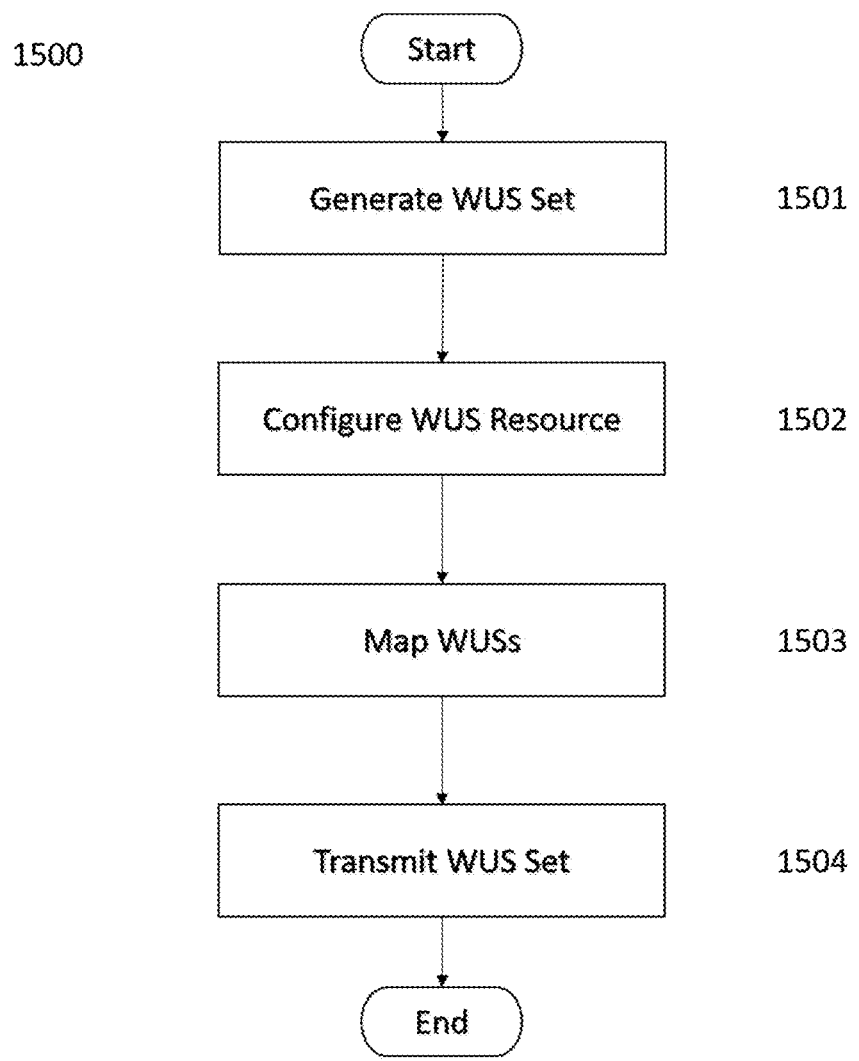
FIG. 15 is a flow chart illustrating a procedure performed at a gNB for WUS transmission according to the embodiments of the invention.

FIG. 15 is a flow chart illustrating a procedure performed at a gNB for WUS transmission according to the embodiments of the invention.

Procedure 1500 illustrates a method performed by a gNB to transmit WUS to a UE.

At step 1501, the gNB generates a WUS set. The WUS set includes 'S' WUSs, where 'S' is the number of actual transmitted SSBs determined according to ssb-PositionsInBurst.

At step 1502, the gNB configures or determines the WUS resource. The procedure may be done explicitly or implicitly as described with reference to FIGS. 12-14.

At step 1503, the gNB maps each WUS in the WUS set to a number of resource sets. The determination of resource sets has been described with reference to FIG. 12 and FIG. 13. The mapping procedure has been described with reference to FIG. 9 and FIG. 10.

At step 1504, the gNB transmits the WUS set to a UE. Here, the $K^{th}$ WUS and $K^{th}$ transmitted SSB are quasi co-located with respect to 'QCL-TypeD'.

Figure 16:
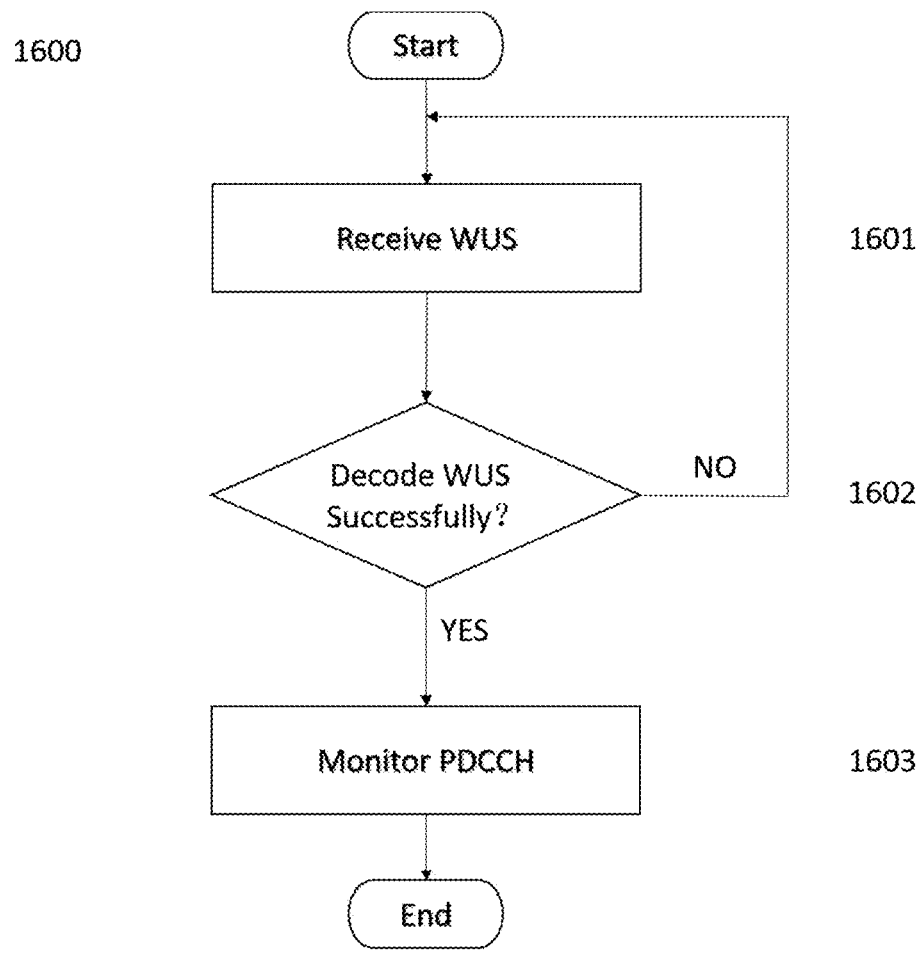
FIG. 16 is a flow chart illustrating a procedure performed at a UE for WUS reception according to the embodiments of the invention.

FIG. 16 is a flow chart illustrating a procedure performed at a UE for WUS reception according to the embodiments of the invention.

Procedure 1600 illustrates a method performed by a UE to receive WUS from a gNB.

At step 1601, the UE receivers a WUS set from a gNB. The WUS set includes 'S' WUSs, where 'S' is the number of actual transmitted SSBs determined according to ssb-PositionsInBurst.

At step 1602, the UE decides whether each WUS has been decoded successfully and the information carried in the WUS has been acquired.

If the WUS has been decoded (YES in step 1602), the procedure will proceed to step 1603; otherwise (NO in step 1602), the procedure will go back to step 1701.

At step 1603, the UE monitors associated PDCCH MOs according to the information acquired from the WUS.

It should be noted that the steps described above are not all necessary. It is possible to perform only some of these steps. The order of steps is also not mandatory but may be performed in other orders or in parallel. The execution of some steps requires signaling. The collective signaling described in the specification as being used for multiple steps may be replaced with separate signaling for individual steps.

In the embodiments described above, the components and the features of the embodiments are combined in a predetermined form. Each component or feature should be considered as an option unless otherwise expressly stated. Each component or feature may be implemented independently of other components or features. Further, the embodiment may be configured by associating some components and/or features. The order of the operations described in the embodiments may be changed. Some components or features of any embodiment may be included in another embodiment or replaced with the component and the feature corresponding to that of another embodiment. It is apparent that the claims that are not expressly cited in the claims section are combined to form an embodiment or be included in a new claim.

The proposed enhancement configuration for NR-light WUS has considered multi-beam operation and different PO configuration between LTE and NR.

With the configuration in the application, the number of WUS transmitted, and the association between SSB and WUS are defined.

With the configuration in the application, the WUS resource and the start position of each of WUS associated to a SSB are explicitly configured/implicitly indicated considering multiple WUS for different beam direction and continuous/discontinuous transmission method.

With the configuration in the application, a gap is defined to solve the problem of cross slot transmission of slot-level WUS, and the gap may be configured to be shorter so that the UE can wake up less to save power.

The embodiments may be implemented by hardware, firmware, software, or combinations thereof. In the case of implementation by hardware, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and so on.

Embodiments may be practiced in other specific forms. The described embodiments are to be considered in all respects as illustrative and not restrictive. The scope of the invention is consequently indicated by the appended claims rather than by the foregoing description. All changes which come within the meaning and range of equivalency of the claims are to be embraced within their scope.

What is claimed is:

1. An apparatus comprising:
    a receiver;
    a transmitter; and
    a processor coupled to the receiver and the transmitter, the processor and one or more of the receiver or the transmitter configured to cause the apparatus to:
        generate a wake up signal (WUS) set comprising of a number of WUSs to indicate that a remote unit is to attempt to receive a paging message in a paging occasion (PO) on a Physical Downlink Control Channel (PDCCH) in a cell;
        map each of the WUSs to a number of resource sets; and
        transmit, to the remote unit, the WUS set on a time-frequency resource,
            wherein the PO is a set of PDCCH monitoring occasions (MOs),
            wherein the number of the WUSs is determined by a number of Synchronization Signal Blocks (SSBs) transmitted by the apparatus, and
            wherein a $K^{th}$ WUS and a $K^{th}$ transmitted SSB are quasi co-located, where K is an integer no more than the number of the WUSs.

2. The apparatus of claim 1, wherein the time-frequency resource is determined at least by a resource start position and a resource duration.

3. The apparatus of claim 2, wherein the resource start position is calculated by a reference start position, a first offset between the reference start position and the resource start position, and a periodicity of the time-frequency resource, and
    wherein the reference start position the first offset, and the periodicity of the time-frequency resource are configured by a higher layer of the apparatus.

4. The apparatus of claim 2, wherein the resource start position is calculated by a first slot of the PO, the resource duration, and a gap between an end of the resource duration and the first slot of the PO.

5. The apparatus of claim 2, wherein the resource duration is configured by a higher layer of the apparatus.

6. The apparatus of claim 2, wherein the resource duration is determined by a beam sweeping period and a maximum number of the beam sweeping period, and
wherein the beam sweeping period is configured by a higher layer of the apparatus.

7. The apparatus of claim 6, wherein the maximum number of the beam sweeping period is determined by the number of resource sets.

8. The apparatus of claim 6, wherein the maximum number of the beam sweeping period is configured by a higher layer of the apparatus.

9. The apparatus of claim 6, wherein a start of the beam sweeping period is calculated by a beam sweeping period gap for the beam sweeping period the beam sweeping period, and a first slot of the PO.

10. The apparatus of claim 9, wherein the beam sweeping period gap is configured by a higher layer of the apparatus.

11. The apparatus of claim 9, wherein the beam sweeping period gap is determined by a gap between an end of the resource duration and the first slot of the PO, the beam sweeping period, and an order at which the beam sweeping period is in the time-frequency resource.

12. The apparatus of claim 11, wherein the gap between the end of the resource duration and the first slot of the PO is determined by a required gap configured by a higher layer of the apparatus and a minimum value between each of the WUSs and corresponding MO.

13. The apparatus of claim 12, wherein a start of each of the WUSs is determined at least by the resource start position, the start of the beam sweeping period, a WUS duration, the order at which a corresponding WUS is in the WUS set, and a second offset between the start of the beam sweeping period and a start of a first WUS, and
wherein the second offset is configured by a higher layer of the apparatus.

14. The apparatus of claim 12, wherein a start of each of the WUSs is configured by a higher layer of the apparatus.

15. The apparatus of claim 13, wherein the WUS duration of each of the WUSs in the beam sweeping period is determined by the beam sweeping period and the number of the WUSs.

16. An apparatus comprising:
a receiver;
a transmitter; and
a processor coupled to the receiver and the transmitter, the processor and one or more of the receiver or the transmitter configured to cause the apparatus to:
receive, from a base unit a wake up signal (WUS) set comprising of a number of WUSs; and
attempt to receive a paging message in a paging occasion (PO) on a Physical Downlink Control Channel (PDCCH) in a cell according to the received WUS set,
wherein each of the one or more WUSs is mapped to a number of resource sets,
wherein the PO is a set of PDCCH monitoring occasions (MOs),
wherein the number of the WUSs is determined by a number of Synchronization Signal Blocks (SSBs) transmitted by the base unit, and
wherein a $K^{th}$ WUS and a $K^{th}$ transmitted SSB are quasi co-located, where K is an integer no more than the number of the WUSs.

17. The apparatus of claim 16, wherein the WUS set is received on a time-frequency resource determined at least by a resource start position and a resource duration.

18. A method comprising:
generating a wake up signal (WUS) set comprising of a number of WUSs to indicate that a remote unit is to attempt to receive a paging message in a paging occasion (PO) on a Physical Downlink Control Channel (PDCCH) in a cell;
mapping each of the WUSs to a number of resource sets; and
transmitting, to the remote unit, the WUS set on a time-frequency resource,
wherein the PO is a set of PDCCH monitoring occasions (MOs),
wherein the number of the WUSs is determined by a number of Synchronization Signal Blocks (SSBs) transmitted by a base unit, and
wherein a $K^{th}$ WUS and a $K^{th}$ transmitted SSB are quasi co-located, where K is an integer no more than the number of the WUSs.

19. The method of claim 18, wherein the time-frequency resource is determined at least by a resource start position and a resource duration.

20. The method of claim 19, wherein the resource start position is calculated by a reference start position, a first offset between the reference start position and the resource start position, and a periodicity of the time-frequency resource.

* * * * *